United States Patent [19]

Farnsworth

[11] 4,069,449
[45] Jan. 17, 1978

[54] FLYBACK TYPE POWER SUPPLY

[75] Inventor: Robert P. Farnsworth, Los Angeles, Calif.

[73] Assignee: Hughes Aircraft Company, Culver City, Calif.

[21] Appl. No.: 654,817

[22] Filed: Feb. 3, 1976

[51] Int. Cl.² .......................................... H02M 3/315
[52] U.S. Cl. ......................................... 363/28; 320/1; 323/DIG. 1
[58] Field of Search ............................... 321/2, 45 R; 323/DIG. 1; 320/1

[56] References Cited

U.S. PATENT DOCUMENTS

| | | | |
|---|---|---|---|
| 3,543,130 | 11/1970 | Reijnders | 321/2 |
| 3,904,928 | 9/1975 | Sawada et al. | 321/2 X |

*Primary Examiner*—William M. Shoop
*Attorney, Agent, or Firm*—W. H. MacAllister; Walter J. Adam

[57] ABSTRACT

A flyback type power supply in which dissipation losses associated with switch transition time are substantially eliminated by performing all switching operations at or near zero current by the use of a plurality of resonant circuits. In a first resonant circuit an intermediate storage capacitor is resonantly charged through an inductor and a first switch until, after a half sinewave of charging current, the voltage on the capacitor is twice the input supply voltage. The capacitor is then discharged through a second switch and the primary inductance of a flyback transformer having rectifiers on the secondary that are back-biased initially so as to provide a resonant current buildup in the primary winding with an amplitude that follows a sinewave function, the primary voltage following a cosine function. At the peak of the sinewave of current in the primary, the voltage across the transformer reverses in polarity, continuing to follow a cosinewave shape until the secondary voltage exceeds the voltage on the network to be charged. The primary current is then discontinued and the remaining energy stored in the transformer inductance is transferred to the circuit to be charged.

17 Claims, 7 Drawing Figures

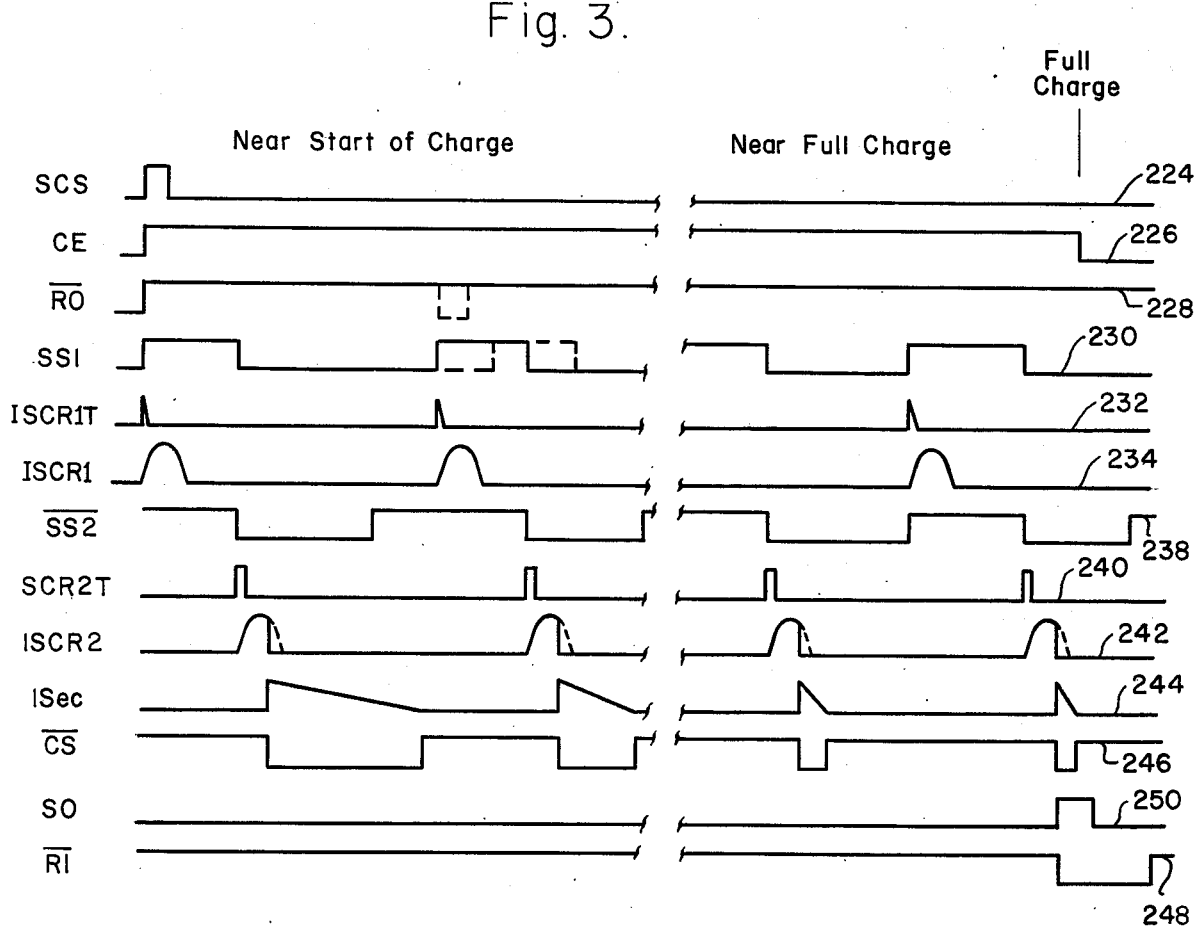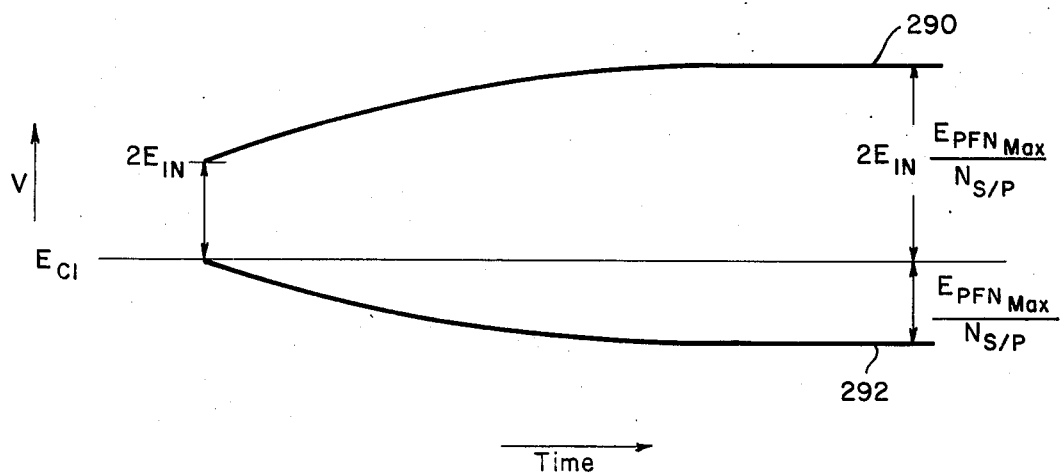

FLYBACK TYPE POWER SUPPLY

BACKGROUND OF THE INVENTION

1. Field of the Invention

This invention relates to power supplies and particularly to a low loss flyback type power supply for charging networks such as capacitive type pulse forming networks.

2. Description of the Prior Art

In power supplies designed for charging capacitive type loads such as a pulse forming network (PFN), it is common to use transistor switches and inductive energy storage to provide relatively efficient power transfer. Prior art circuits generally are either of a high dissipation type which utilize series resistance to limit the initial charging current or use flyback switching regulators in which transistors interrupt large currents in inductive circuits allowing the inductively stored energy to be transferred to the capacitive load. Generally several hundred to a few thousand cycles of the transistor switch are required for a single PFN charging and each time the transistor is turned off the voltage across the switching device rises to greater than the supply voltage prior to the current decreasing, thus producing relatively high instantaneous losses. A charging circuit that would eliminate the brief periods of high dissipation by performing all switching operations when substantially zero current is passing through the switch would be a substantial advantage to the art.

SUMMARY OF THE INVENTION

The power supply for charging a capacitive load in accordance with the principles of the invention, eliminates the brief periods of high dissipation found in prior art circuits by performing all switching operations at substantially zero current as a result of the operation of resonant circuits utilized in a flyback switching configuration. In one arrangement in accordance with the invention, an intermediate storage capacity is first resonantly charged through an inductor and a first switch with the first switch being a transistor or a silicon control rectifier (SCR) switch, for example. The voltage on the capacitor following a half sinewave of charging current increases to twice the input supply voltage and is then resonantly discharged through a second switch and the primary winding inductance of a flyback transformer. Rectifiers are provided on the secondary of the transformer and are back biased by the potential reflected from the primary winding as well as any voltage across the load, so as to provide in the transformer, a resonant buildup of current following a sinewave function. The primary voltage follows a cosinewave function. At the peak of the sinewave the voltage across the transformer reverses in polarity, following a cosinewave shape until the secondary voltage exceeds the PFN voltage. At that point in time the primary current is discontinued, the secondary rectifiers are biased into conduction and the remaining energy stored in the transformer inductance is transferred to the capacitive load. During all switching operations the current flowing through the switches is substantially zero.

It is therefore an object of this invention to provide an improved power supply for charging up a capacitive type network.

It is a further object of this invention to provide a flyback power supply that substantially eliminates switching losses.

It is another object of this invention to provide a power supply for charging a capacitive load to a high voltage in which unidirectional current is always switched at a substantially zero current value.

It is a further object of this invention to provide a flyback switching regulator that is readily adaptable to the use of thyristor switches for part or all of the switching devices.

It is a still further object of this invention to provide an improved and highly efficient circuit for charging a pulse forming network.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein:

FIG. 3 is a schematic diagram of waveforms of current and voltage as a function of time for explaining the control operation of the power supply of FIG. 1;

FIG. 5 is a schematic diagram of voltage as a function of time for explaining the locus of the peaks on the temporary storage capacitor during the charging of the pulse forming network of FIG. 1 or FIG. 2;

DESCRIPTION OF THE PREFERRED EMBODIMENT

Figure 1:
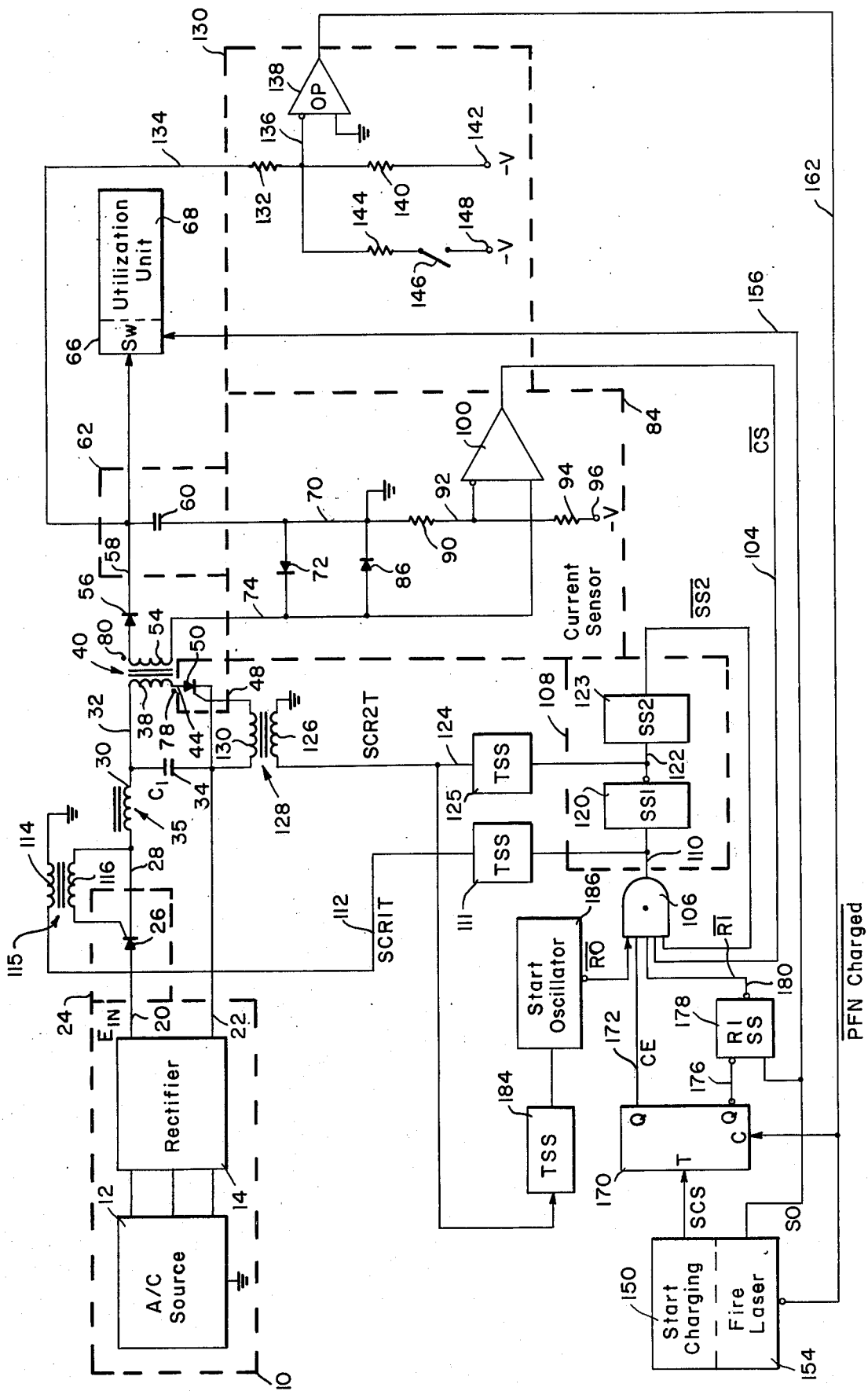
FIG. 1 is a schematic block and circuit diagram showing the resonant power supply in accordance with the principles of the invention.

Referring first to FIG. 1, a DC power source 10 may include an alternating current (AC) source 12 which applies three-phase current to a rectifier 14 developing an unregulated DC voltage on leads 20 and 22, the lead 22 being below ground potential because the neutral of that transformer or generator in the AC source 12 is grounded, in the illustrated arrangement. The power source 10 may be any other suitable arrangement such as a DC power supply with the lead 22 grounded or at any selected potential level. A first resonant circuit 35 includes a switch 24 which may be any suitable type of switch such as a transistor and series coupled diode or the illustrated thyristor switch or SCR (silicon controlled rectifier) 26 having its input terminal coupled to the lead 20 ($E_{in}$) and an output terminal coupled to a lead 28. An inductor 30 is coupled between the lead 28 and a lead 32 which in turn is coupled through an intermediate storage capacitor 34 (C1) to the lead 22. The switch 24, the inductor 30 and the capacitor 34 form the first resonant circuit 35 for charging the capacitor 34.

The lead 32 is coupled to one end of a primary winding 38 of a transformer 40 with the other end of the primary winding 38 being coupled to a lead 44 which in turn is coupled to the input terminal of a switch 48 which may be of any suitable type such as a transistor in series with a diode or the illustrated thyristor switch or SCR 50. The other terminal of the SCR 50 is coupled to the lead 22.

A secondary winding 54 of the transformer 40 is coupled through a switching means which may be a rectifier or a diode 56, to a lead 58 which in turn is applied to one plate of a pulse forming network (PFN) indicated as a capacitor 60 of a charging network 62. The lead 58 is also coupled to a switch 66 of a utilization unit 68 which for example may be a flash tube pump source for a laser that is fired in response to the energy stored in the capacitor 60 at a relatively high voltage. The other plate of the capacitor 60 is coupled through a lead 70 to ground in the illustrated arrangement. The other terminal of the secondary winding 54 is coupled through the cathode to anode path of a diode 72 to ground and through the anode to cathode path of a diode 86 to ground, the diodes being a portion of a current sensor 84. The transformer 40 has a polarity relation as shown by dots 78 and 80 and has a selected secondary to primary winding ratio $N_{s/p}$. The current sensor 84 also includes a resistor 90 coupled from ground to a lead 92 which is in turn coupled through a resistor 94 to a suitable $-V$ potential at a terminal 96. A differential amplifier 100 has an inverting terminal coupled to the lead 92 and a second terminal coupled to the lead 74 to detect the presence of current flowing through diode 72 and thus through the secondary winding 54.

The output terminal of the differential amplifier 100 is coupled through a lead 104 to apply a signal $\overline{CS}$ representing the absence of sensed current, to the input of an AND gate 106 which in turn controls a sequencer 108 through a lead 110. The signal on the lead 110 is also applied through a single shot circuit 111 as a trigger pulse SCR1T for the SCR 26 through a lead 112 to one end of a primary winding 114 of a transformer 115 coupled to ground at the other end thereof. The transformer 115 has a secondary winding 116 coupled between the control terminal of the SCR 26 and the lead 28. A first single shot circuit 120 in the sequencer 108 is coupled to the lead 110 and in the illustrated arrangement provides a fixed delay time between the triggering of the two switches 24 and 48. The output of the single shot circuit 120 is applied through a lead 122 to a single shot circuit 125 and in turn through a lead 124 as the signal SCR2T to a primary winding 126 of a transformer 128 having a secondary winding 130 coupled between the control terminal of the SCR 50 and the lead 22. Triggering of switch 48 occurs at the positive going trailing edge of the output of single shot 120. Also the signal on the lead 122 is applied to the single shot 123 and therefrom to the AND gate 106 as signal $\overline{SS2}$.

A voltage sensor 130 for determining when the charging network 62 has reached a predetermined or selected value, includes a resistor 132 coupled through a lead 134 to the lead 58 with the other end of the resistor 132 coupled to a lead 136 which is in turn coupled to an inverting terminal of an operational or differential amplifier 138 having its other input terminal coupled to ground. To provide a reference voltage, the lead 136 is coupled through a resistor 140 to a negative voltage or $-V$ terminal 142 and if the voltage is to be selected, other parallel resistors such as a resistor 144 may be coupled between the lead 136 and a terminal of a switch 146 having its other terminal coupled to a $-V$ terminal 148.

A start charging circuit 150 applies a pulse SCS to a trigger circuit (not shown) which triggers a charge enable flip-flop 170. The start charging circuit 150 may respond to a laser firing circuit 154 which may include a desired delay after a fire laser pulse is applied from the firing circuit 154 through a lead 156 to the switch 66 to transfer the energy stored in the capacitive storage unit 62. In response to a logic zero signal $\overline{PFN\ charged}$ on a lead 162 from the operational amplifier 138 of the voltage sensing circuit 130, the utilization unit 68, which may be a laser is fired, or if desired, a delay may be included therein after the capacitor 60 has reached the selected voltage value. It is to be noted that the laser may also be fired manually by a switch in the laser fire unit 154. In a discharged condition, the $\overline{PFN\ charged}$ signal being in a logic one state on the lead 162, the start charging circuit 150 triggers the flip-flop 170 to the charge enable condition, CE, and applies a high logic level through the set output lead 172 to the AND gate 106 which is another requirement for starting the pulse forming network charging sequence. The inverted output terminal of the flip-flop 170 applies an inverted signal through a lead 176 to a recharge inhibit (RI) single shot circuit 178 which applies a $\overline{RI}$ pulse through a lead 180 to the AND gate 106. The $\overline{RI}$ signal may be used to inhibit recharging for a period of 5 MS at the commencement of charging to assure that adequate time is allowed to turn off the load switch in the utilization unit 68. In order to prevent possible spontaneous termination of the cycling operation and to start initial operation, the SCR2T pulse on the lead 124 is applied to a single shot circuit 184 which applies an inhibit pulse to a start oscillator 186 which in turn, when not inhibited, applies a train of pulses $\overline{RO}$ to the AND gate 106 to start the cyclic operation. Under normal operation, the cycling of sequencer 108 occurs at such a repetition rate as to cause single shot 184 to supply a continuous inhibit signal to oscillator 186. The repetion period of the sequencer 108 is determined by the sum of the pulse time of single shot 120 in 108 plus either the pulse time of single shot 123 in 108 or the decay time of the current in the secondary 54 of transformer 40 as sensed by the current sensor circuit 84, whichever in longer. It is to be noted that the principles of the invention are not to be limited to particular illustrated control arrangement but may include any suitable type control arrangement for generating the switching pulses for the switches 24 and 48.

Figure 2:
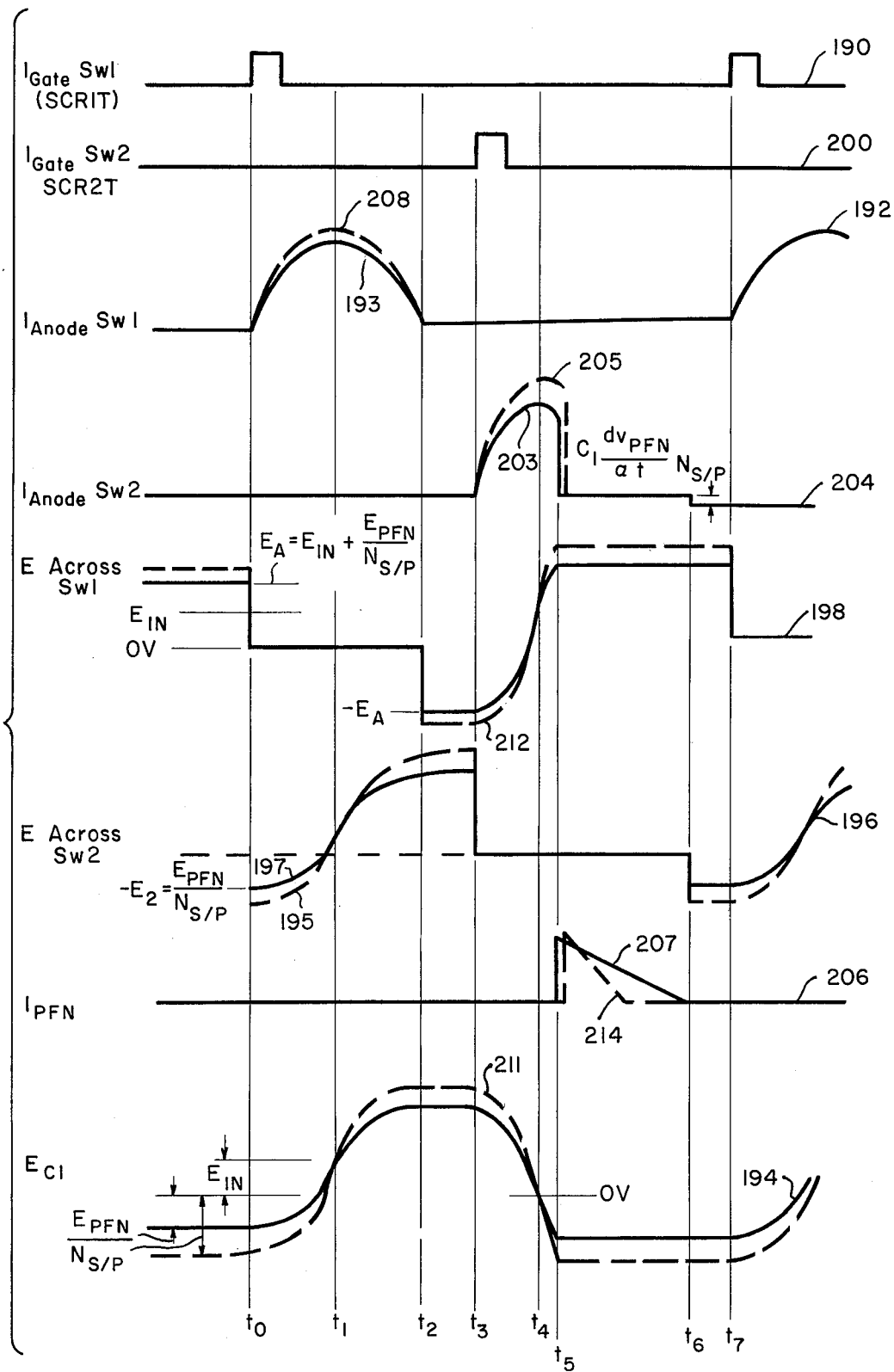
FIG. 2 is a schematic diagram of waveforms of voltage and current as a function of time for explaining the operation of the power supplies in accordance with the invention.

Referring now to FIG. 2 as well as to FIG. 1, the operation of the flyback power supply will be explained in further detail. For starting each cycle of the charging operation, the pulse SCR1T of the waveform 190 is generated by the AND gate 106 at a time $t_0$ and the SCR switch 26 is biased into conduction to allow resonant charging of the intermediate storage capacitor 34. Current on the lead 28 or the cathode of switch SW1 flows through the inductor 30 to the capacitor 34 with a resonant half sine wave configuration as shown by a wave 193 of a waveform 192. The voltage on the capacitor C1 responds to the half sinewave of charging current causing the voltage on the lead 32 as shown by a waveform 194 to increase from a voltage of $$-V - \frac{V_{pfn}}{\frac{N_s}{p}}$$

(or $-V$ volts for the first cycle) to a voltage $-V + E_{in}$ at a time $t_1$. The voltage across the switch SW1 as shown by a waveform 198 remains at substantially 0 volts until a time $t_2$ at which time the resonant current stops, SW1 is triggered out of conduction because of the absence of sustaining current and the voltage across switch SW1 as shown by the waveform 198 drops to $$-\left(E_{in} + \frac{E_{pfn}}{\frac{N_s}{p}}\right)_o$$

referred to in FIG. 2 as $E_a$, with a potential on the lead 20 which is negative with respect to the potential on the lead 28.

The voltage across switch SW2 as shown by a waveform 196 also rises from $$\frac{-E_{pfn}}{\frac{N_s}{p}}$$

to $E_{in}$ between times $t_0$ and $t_1$ as shown by a curve 197 during an early cycle of operation. During the first cycle, the voltage across SW2 at time $t_0$ of the waveform 196 starts its rise from zero volts. The term $E_{pfn}$ is the voltage across the capacitor or pulse forming network 60 and $N_{s/p}$ is the secondary to primary turns ratio of the transformer 40 which for example may be 8.

The capacitor C1 retains its charge as shown by the waveform 194 until a time $t_3$ at which time, the trigger pulse SCR2T of a waveform 200 is applied to the switch 48 biasing it into conduction. The capacitor C1 is then discharged through the switch SW2 and the primary inductance of the winding 38 in a resonant fashion as shown by a current pulse 203 of a waveform 204 at the anode of switch SW2. The rectifier or diode 56 at the secondary winding 54 is backed biased initially to result in the resonant buildup of current following a sinewave function until a time $t_5$. At the peak of the sinewave of the waveform 204 at a time $t_4$, the voltage across the primary winding 38 reverse in polarity as shown by the waveform 194 crossing 0 Volts and continues to follow a cosinwave shape until the secondary voltage exceeds the PFN voltage at the time $t_5$. Between the times $t_4$ and $t_5$ the potential on the lead 32 is negative relative to the potential on the lead 44, however current continues to flow through the primary winding 38 and the switch 48 due to the energy stored in the primary inductance of transformer 40. At the time $t_5$ the secondary voltage exceeds the PFN voltage and the diode 56 is biased into conduction, the primary current is discontinued as shown by the waveform 204, the voltage across switch SW1 remains constant as shown by the waveform 198 and the voltage across the capacitor C1 remains constant as shown by the waveform 194. The remaining energy stored in the transformer 40 is then transferred to the load capacitor 60 as current flows through the diode 56 as shown by the $I_{pfn}$ signal 207 of a waveform 206. It is to be noted that the current through the anode of switch SW2 does not drop to 0 current between times $t_5$ and a time $t_6$ as shown by the waveform 204 but retains a value $$\frac{c_1 \frac{dE_{pfn}}{dt}}{\frac{N_s}{p}}$$

provided this current is sufficiently large to provide sustaining current to the SCR switch SW2. In general, however, SW2 turns off at time $t_5$. The rate $$\frac{dE_{pfn}}{dt}$$

is the rate of change of the voltage for the capacitor 60. At a time $t_6$ the voltage across the primary 38 of transformer 40 goes to 0. The voltage across switch SW2 of the waveform 196 drops below 0, the voltage on the anode of the diode 56 becomes negative with respect to the cathode lead 58, the charge on the lead 32 remains negative as the SCR 50 is maintained nonconductive by the reverse voltage on SW2 48, and the charge on the lead 58 remains positive due to the blocking action of diode 56. At the time $t_7$, a resonant charging cycle is again initiated in response to the switching pulse SCR1T of the waveform 190 and the process continues in a similar manner. When the pulse forming network is fully charged after many cycles of the above sequence, the sequence is interrupted by a logic 0 signal on line 162, stopping the sequence at a time equivalent to $t_6$ of FIG. 2.

During subsequent sequences within a single PFN charging cycle, the current of the waveform 192 increases as shown by the sinewave 208, the voltage across switch SW1 drops to a lower level at time $t_2$ and rises to a higher level at time $t_5$ as shown by the dotted curve 212 of the waveform 198. The voltage across the switch SW2 decreases to a lower value at time $t_0$ and increases to a higher value at time $t_1$ as shown by a curve 195 of the waveform 196 and the current at the anode of switch SW2 rises to a higher level between times $t_3$ and $t_4$ as shown by a curve 205 of the waveform 204 during the second resonant cycle while the charge is stored in the second resonant circuit. Conduction through the switch SW2 is terminated an increasingly later time after time $t_5$ because of the increased value stored in the circuit 62 resulting in the discharge current $I_{pfn}$ of the waveform 206 starting at a later time as shown by a dotted wave 214 and terminating the transfer of energy to the capacitor 60 at a shorter time from its start with a greater rate of current decrease or slope. The voltage $E_{cl}$ across the capacitor 34 at subsequent cycles has a lower voltage at time $t_0$ and between times $t_5$ to $t_7$ as shown by a wave 211 and rises to a higher value at time $t_2$. This operation continues for the required number of cycles to charge the capacitive element or network 60 to the predetermined or selected value.

Referring now also to FIG. 3 the illustrated control arrangement will be explained in further detail. To start charging of the network 62, a start charging sync pulse SCS of a waveform 224 is generated by the start charging circuit 150 and is applied to the flip-flop 170 to generate the charge enable pulse CE of a waveform 226. The CE pulse remains high during the entire number of cycles required to charge the network 62. Due to the absence of signals from single shot SS1 - 120, prior to triggering the charge enable flip-flop 170, the start oscillator 186 produces a pulse train output $\overline{RO}$ of a waveform 228. In response to the leading edge of the single shot one SS1 pulse of a waveform 230, the trigger single shot 184 generates an inhibit pulse, preventing further output from the start oscillator 184 so long as the sequencer 108 continues to cycle.

The $\overline{RO}$ pulse is utilized so that if the system fails to trigger during any cycle, the cycle is restarted during the extended period of the illustrated pulse SS1 of the waveform 230. The rising edge of the SS1 pulse of the waveform 230 causes a trigger current to pass through the SCR1 switch 26 illustrated as a waveform 232, labelled $I_{SCR1T}$. The current in the SCR switch 26 or $I_{scr1}$ of a waveform 234 is thus initiated as a half sinewave for the resonant charging of the capacitor 34. The SS1 pulse from the single shot circuit 120 as shown by the waveform 230 terminates to initiate the $\overline{SS2}$ pulse of a waveform 238, and a trigger pulse SCR2T 240 triggers the SCR switch 50 into conduction. As the energy is transferred through the primary winding 38, the $I_{scr2}$ half sinewave of a waveform 242 is generated but terminates when the $I_{sec}$ or secondary current of a waveform 244 is formed as the energy is tranferred to the capacitive network 62. The $\overline{CS}$ pulse of the waveform 246 remains at a logic 0 during the time that current flows in the secondary winding 54 and must be in a logic 1 state as one of the conditions for retriggering the charging cycle. The recycle inhibit pulse $\overline{RI}$ of a waveform 248 remains high during all of the charging cycles. As the pulse forming network 62 reaches its full charge after the number of cycles determined by the parameters of the network, which for example may be a few cycles to many thousand cycles, the current that is transferred to the secondary winding as shown by the waveform 244 flows from the secondary winding 54 for a much shorter period of time.

Upon the occurrence of a full charge condition, the pulse CE of the waveform 226 drops to 0 volts in response to the change of voltage on the lead 162 and a laser firing sync out pulse SO of a waveform 250 is generated in the circuit 154 for activating the switch 66 and firing the laser in the utilization unit 68. In response to the firing pulse SO the signal $\overline{RI}$ of a waveform 248 drops to a low level at the input of the AND gate 106. The $\overline{SS2}$ pulse of the waveform 238 continues to recover to a logic 1 but does not energize the AND gate 106 because the signal on lead 172 inhibits operation. In response to another start charging pulse SCS (not shown) the operation again may be initiated after firing the laser and discharging the pulse forming network 62.

Figure 4:
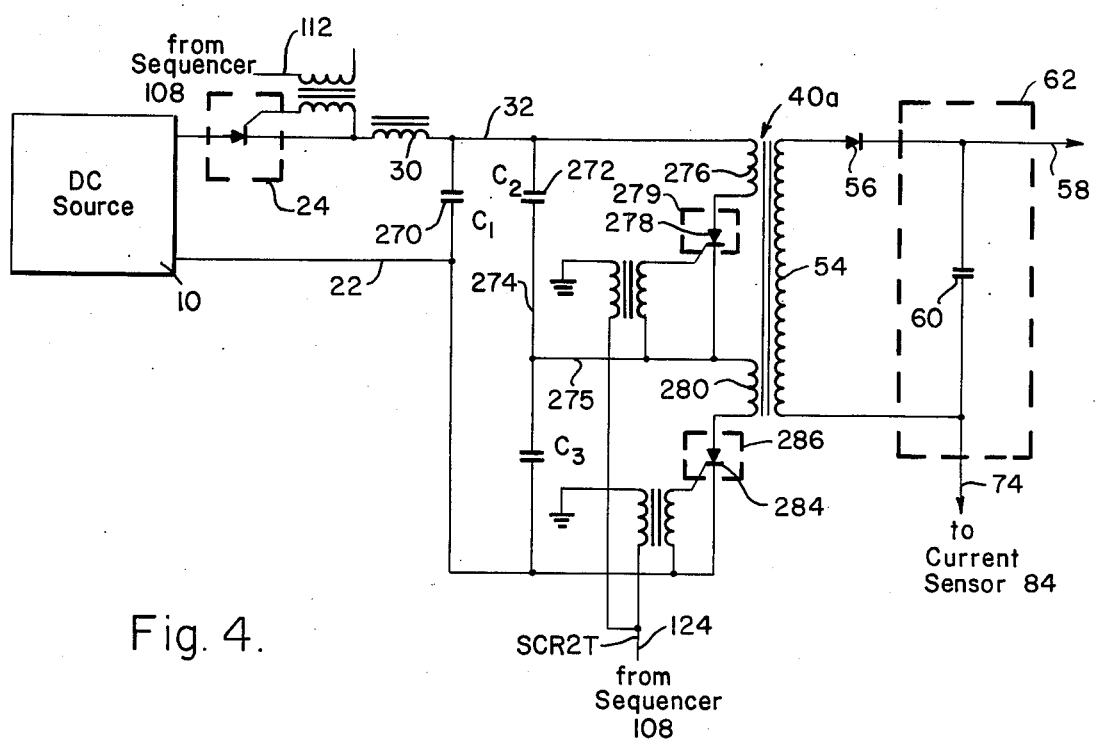
FIG. 4 is a schematic block and circuit diagram showing another arrangement of the power supply in accordance with the principles of the invention.

Referring now to FIG. 4, an arrangement in accordance with the principles of the invention is shown where high input voltages are required or where a low step-up ratio in the transformer results in excessive voltage across switches SW1 or SW2. A series connection of additional temporary storage capacitors and switches may be utilized. A capacitor 270 or capacitor $C_1$ is coupled between the leads 32 and 22, a supplemental capacitor 272 or capacitor $C_2$ is coupled between the lead 32 and a lead 274. A first primary winding 276 of a transformer 40a is coupled between the lead 32 and an SCR switch 278 of a switch 279 (SW2a) having its output coupled to a lead 275 in turn coupled to the lead 274. A second primary winding 280 is coupled between the lead 275 and the input terminal of an SCR switch 284 of a switch 286 (SW2b) having its output terminal coupled to the lead 22. The second trigger pulse SCR2T is applied through suitable transformers to both the SCR switch 278 and the SCR switch 284. The operation of the series arrangement of FIG. 4 is similar to that of FIG. 1 except that during the first resonant action the capacitor C1, and the series combination of C2 and C3 charge as parallel capacitors with the voltage across C2 and C3 and the respective switches SW2a 279 and SW2b 286 being one half of the voltage across C1. During the discharge of the capacitors to transfer the energy to the primary windings 276 and 280, the currents flow in the series path of capacitors C2 and C3 and from capacitor C1 through the series connected primary inductances 276 and 280. Current may not flow in the lead 275 except due to stray unbalance in the circuit elements. During the time of transfer of current from the windings 276 and 280 to the charging capacitance 60, the energy is transferred through the magnetic coupling similar to the operation of the circuit of FIG. 1. Any desired number of supplemental capacitors C2 and switches SW2 may be utilized within the scope of the invention.

Referring now to FIG. 5 which shows the locus of the peaks of the charge $E_{c1}$ on the capacitor C1 for FIG. 1 (or $C_1$ + ($C_2$ in series with $C_3$) for FIG. 4) along curves 290 and 292 over the total number of charge cycles required to charge the network 62. It is noted that during the first cycle the capacitor C1 is charged to a voltage $2E_{in}$ relative to the voltage on lead 22. After the charging is completed the capacitor C1 is charged to a positive value $$2E_{in} + \frac{E_{pfn(max)}}{N_{\frac{s}{p}}}$$

from a negative value $$\frac{E_{pfn(max)}}{N_{\frac{s}{p}}},$$

all relative to the potential on lead 22.

The following values are shown to illustrate the equations applicable to the switches SW1 and SW2 and typical values of the parameters in one arrangement in accordance with the principles of the invention.

| PARAMETER | EQUATION | TYPICAL VALUE |
|---|---|---|
| SW1 | | |
| $I_p$ | $(E_{in} + E_o)\sqrt{C1/L1}$ | 54 A |
| di/dt | $I_p \omega_1$ | 10 A/µs (micro seconds) |
| $E_f$ peak | $E_{in} + E_o$ | 1146 V |
| dE/dt | $(2E_{in} + E_o)\omega 1$ | 342 V/µs |
| $E_{rev}$ peak | $(E_o + E_{in})$ | 1146 V |
| $T_{reverse}$ | ≧5µs, therefore the control circuit must add an additional 15 µs for 20 µs turn off devices | |
| SW2 | | |
| $I_p$ | $(2E_{in} + E_o)\sqrt{C1/L_p}$ | 84.6A |
| di/dt | $I_p \omega 2$ | 15.9 A/µs |
| $E_f$ peak | $(2E_{in} + E_o)$ | 907 V |
| dE/dt | $(E_{in} + E_o)\omega 2$ | 216 V/µs |
| $E_{rev}$ peak | $E_o$ | 477 V |
| where $I_p$ | = instantaneous peak current | |
| di/dt | = rate of buildup of current | |

-continued

| PARAMETER | EQUATION | TYPICAL VALUE |
|---|---|---|
| $E_f$peak | = peak device blocking voltage in the forward bias direction | |
| $dE/dt$ | = rate of application of forward voltage | |
| $E_{rev}$ peak | = peak reverse voltage | |
| $N_{S/P}$ | = secondary to primary turns ratio | |
| $E_{in}$ | = peak input voltage | |
| $E_o$ | $= \dfrac{E_{PFN}}{N_{\frac{s}{p}}}$ | |
| $E_f$ | = forward device voltage while blocking | |
| $\omega 1$ | $= \sqrt{L_1 C_1}$ | |
| $\omega 2$ | $= \sqrt{L_p C_1}$ | | where $L_I$ and $L_p$ are the respective inductance of inductor 30 and primary winding 38 of transformer 40. It is to be noted that $E_f$peak and $dE/dt$ for the circuit of FIG. 4 is the same as shown above but divided by 2 because of the series connection of two switching devices.

Figure 7:
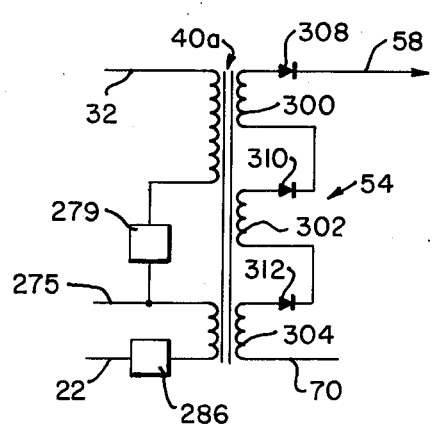
FIG. 7 is an alternate configuration of the secondary winding and rectifier arrangement that may be utilized in the system of FIG. 4 within the scope of the invention.
Figure 6:
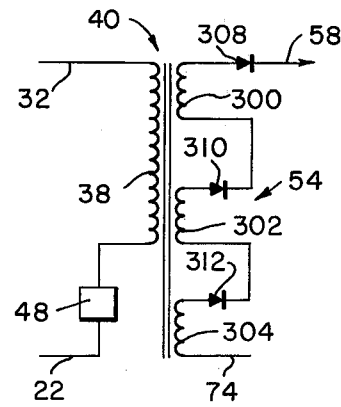
FIG. 6 shows an alternate configuration of the secondary winding and rectifier arrangement for the transformer that may be utilized in the system of FIG. 1 within the scope of the invention.

Referring now to FIGS. 6 and 7 the secondary winding 54 in some arrangements in accordance with the invention for improved efficiency, may be divided into a selected number of segments such as segments 300, 302 and 304. These segments are isolated from each other by rectifiers or diodes 308, 310 and 312 which in the system of the invention jointly operate as the rectifier arrangement, all being forward biased when the current is transferred to the capacitive element 60. This secondary winding arrangement allows the stray capacitance associated with each segment to initially charge but prevents it from discharging between repetitive cycles, which could cause additional flow of primary current and dissipation losses. The arrangements of FIGS. 6 and 7 are well known in the art and are further explained in U.S. Pat. No. 3,562,623, Robert P. Farnsworth, Inventor. It is to be noted that other arrangements to improve the efficiency such as segmenting the primary winding as described in the above referenced patent may also be utilized within the scope of the invention. It is to be noted that the switching or rectifier arrangement coupled between the secondary winding and the load (including the arrangements of FIGS. 1, 4, 6 and 7) in the combinations of the invention may be any suitable arrangement and for example may be a properly controlled and timed switch or switches.

Thus there has been described circuits for the elimination of switching losses in flyback switching regulators by utilizing resonant currents. The circuits may utilize all or part of their switches as SCRs, transistors or any suitable switches. Also the circuits may have the period of the resonant charging of the temporary capacitor or capacitors either the same or different than the period of charging the primary winding, all within the scope of the invention. The principles of the invention are applicable to charging any suitable circuit, network or load and are not to be limited to charging pulse forming networks. Further, the concepts of the invention are applicable to other configurations, combinations including the inventive concepts and arrangements and to other charging combination, all within the scope of the invention.

What is claimed:

1. A power supply circuit supplying power to a capacitive load comprising:
    a source of current,
    a first resonant charging circuit coupled to said source and including first switching means,
    a second resonant charging circuit including second switching means coupled to said first resonant circuit, and
    third switching means for coupling energy from said second resonant circuit to said load.

2. The combination of claim 1 further including capacitive means coupled to said first and second resonant charging circuits.

3. The combination of claim 1 further including a capacitor coupled to said first and second resonant charging circuits and in which said first resonant circuit includes an inductor coupled between said first switching means and said capacitor.

4. The combination of claim 1 in which the switching means of said first and second resonant charging circuits are thyristors.

5. A power supply circuit for charging a capacitive element in response to a source of current comprising:
    first switching means coupled to said source of current,
    inductive means coupled to said first switching means,
    capacitive means coupled between said inductive means and said source of current, said inductive means and said capacitive means forming a first resonant circuit with said capacitive means for storing current passed through said first switching means,
    transformer means having first and second winding with said first winding coupled to said capacitive means, and said second winding coupled to said capacitive element to provide a current path thereto, said first winding and said capacitive means forming a second resonant circuit,
    second switching means coupled between said first winding and said capacitive means for passing current from said capacitive means, said transformer means storing as magnetic current said current passed through said second switching means, and
    rectifier means coupled in the current path of said second winding.

6. The combination of claim 5 further including a source of switching pulses coupled to said first and second switching means for first switching said first switching means into conduction and then after a selected interval switching said second switching means into conduction until substantially biased out of conduction when said capacitive means is substantially discharged, said rectifier means conducting to transfer current to said capacitive element when said second switching means is substantially biased out of conduction.

7. The combination of claim 6 in which said first and second switching means are thyristors.

8. A power supply circuit for charging a capacitive element comprising:
    a source of current,
    first switching means coupled to said source,
    a first resonant circuit coupled to said switching means and including capacitive means,
    a second circuit coupled to said capacitive means, said second circuit including a first transformer winding and being resonant with said capacitive means,
    second switching means coupled in said second circuit for switching the current from said capacitive means to said first transformer winding and for being substantially biased out of conduction in response to the substantial discharge of said capacitive means, a second transformer winding coupled to said first transformer winding, and third switching means coupled between said second winding and said capacitive element for passing the current from said first transformer winding to said capacitive element when said first and second switching means are substantially nonconductive.

9. The combination of claim 8 further including a source of switching pulses coupled to said first and second switching means for first triggering said first switching means into conduction and then after a predetermined interval triggering said second switching means into conduction.

10. A circuit for charging a capacitive element from a power source having first and second terminals comprising:

first switching means having an input and an output terminal with said input terminal coupled to the first terminal of said power source, inductive means having first and second terminals with the first terminal coupled to the output terminal of said first switching means, capacitive means having first and second terminals respectively coupled between the second terminal of said inductive means and the second terminal of said power source, said inductive means and said capacitive means forming a first resonant circuit, a transformer having first and second windings, said first winding having first and second terminals with the first terminal coupled to the first terminal of said capacitive means, said first winding and said capacitive means forming a second resonant circuit, second switching means having an input and output terminal respectively coupled between the second terminal of said first winding and the second terminal of said capacitive means, and rectifying means coupled between said second winding and said capacitive element.

11. The combination of claim 10 in which said first and second switching means include control terminals, said combination further including a source of switching pulses coupled to the control terminals of said first and second switching means for energizing said first switching means to resonantly charge said capacitive means through said inductive means and after a selected time interval energizing said second switching means to resonantly charge said first winding from said capacitive means.

12. The combination of claim 11 in which said first and second switching means are silicon controlled rectifiers.

13. The combination of claim 1 in which said first and second switching means are thyristors.

14. A circuit for charging a capacitive network from a power source having first and second terminals comprising:

first switching means having an input and an output terminal with said input terminal coupled to the first terminal of said power source, an inductor having first and second terminals with the first terminal coupled to the output terminal of said first switching means, first capacitive means having first and second terminals respectively coupled between the second terminal of said inductive means and the second terminal of said power source, a plurality of second capacitive means coupled in series between the second terminal of said inductive means and the second terminal of said power source, a transformer having a plurality of first winding means and second winding means, said first winding means including first and second end winding means, a plurality of second switching means with one coupled between each two adjacent series coupled first winding means, one coupled between said first end winding means and said second terminal of said power source, and with a coupling between a selected terminal of a selected first winding means and said plurality of second capacitive means, and rectifying means coupled between said second winding means and said capacitive network.

15. The combination of claim 14 in which said switching means are thyristor switches.

16. A power supply circuit for charging a capacitive element comprising:

a source of current, a first resonant circuit coupled to said source and including first switching means and capacitive means, a second resonant circuit including a first transformer winding and second switching means with said first transformer winding coupled to said capacitive means and said second switching means coupled between said first transformer winding and said source of current, a second transformer winding coupled to said first transformer winding and being formed of segments, and rectifying means coupled between said segments, and between a first end segment and said capacitive element.

17. A power supply circuit for charging a load in response to a source of voltage comprising:

a first resonant circuit coupled to said source of voltage and including first switching means and a storage element, said first switching means coupled to said source of voltage so that when said first switching means is activated energy is transferred from said source to said storage element with a relatively small initial current, a second circuit coupled to said storage element and being resonant therewith, said second resonant circuit including second switching means coupled between said storage element and said source of voltage so that when said second switching means is activated, energy is transferred from said storage element to said second circuit with a relatively small initial current, and third switching means coupled to said second circuit and being operable so that when activated, energy is transferred from said second resonant circuit to said load.

* * * * *